United States Patent [19]

Edwards et al.

[11] 4,026,933

[45] May 31, 1977

[54] PARTICULATE OIL-BLACK MASTERBATCH

[75] Inventors: Douglas Cameron Edwards; Erhardt Fischer, both of Sarnia, Canada

[73] Assignee: Polysar Limited, Sarnia, Canada

[22] Filed: Feb. 9, 1976

[21] Appl. No.: 656,272

[30] Foreign Application Priority Data

Mar. 20, 1975 Canada ................................ 222659

[52] U.S. Cl. ...................... 260/33.6 AQ; 260/23 S; 260/30.6 R; 260/30.8 R; 260/31.2 MR; 260/31.8 DR; 260/33.2 R; 260/34.2; 260/42.55; 526/43; 526/45; 526/47

[51] Int. Cl.² ...................... C08C 1/14; C08F 6/22; C08J 3/20; C08K 5/01

[58] Field of Search ................ 260/30.6 R, 30.8 R, 260/31.2 MR, 31.8 DR, 33.6 AQ, 34.2, 42.55, 33.2 R; 526/43

[56] References Cited

UNITED STATES PATENTS 3,846,365  11/1974  Berg et al. ................. 260/33.6 AQ
3,945,978  3/1976   Berg et al. ................. 260/33.6 AQ

*Primary Examiner*—Stanford M. Levin
*Attorney, Agent, or Firm*—Stevens, Davis, Miller & Mosher

[57] ABSTRACT

Synthetic rubber-black-plasticizer masterbatches are prepared in a particulate form, in contrast with their normal massed form, by a process which involves halogenating the rubber-black masterbatch after coagulation, but before addition of the plasticizer.

7 Claims, No Drawings

PARTICULATE OIL-BLACK MASTERBATCH

This invention relates to reinforced and plasticized synthetic rubber compounds and methods for preparing such compounds. More specifically it refers to methods of preparing synthetic rubber compounds reinforced with carbon black and extended with compatible plasticizers, notably oil.

It is common practice to prepare rubber masterbatches by polymerizing the rubber forming monomers in aqueous emulsion, adding carbon black to the latex masterbatch, and then coagulating the rubber and black to form a black masterbatch. It is also common practice to add plasticizer such as oil to synthetic rubber, either to the latex or to the dry rubber-black mixture, to form an oil-black materbatch. This oil black masterbatch is then compounded with a variety of known ingredients, molded and cured to form useful rubber goods.

In physical nature and appearance, oil black masterbatch rubber is non-particulate, rubbery substance which is inconvenient to transport and handle. Thus it is usually shipped from the rubber manufacturer to the compounder in bales of about 70 lbs weight, each bale being separately packaged to prevent adhesion one to another during storage and shipping. Availability of such a product in a form which is easier to handle, such as in particulate form, would eliminate the task of cutting up bales to obtain the necessary weights for compounding. These masterbatches of the prior are have to be subjected by the compounder to extensive further mixing in order to obtain good dispersion of the black. It would be of advantage to be able to reduce the degree of such mixing.

The present invention provides a process whereby a rubber-black-plasticizer masterbatch is provided comprised of small essentially discreet particles. This is achieved by mixing synthetic rubber latex and carbon black, coagulating the mixture, treating the coagulated solids with halogenating agent, and then mixing plasticizer with the halogenated solids to yield the final masterbatch.

Thus according to the present invention, there is provided a process for the preparation of particulate rubber masterbatches of emulsion polymerized synthetic rubber, carbon black and compatible plasticizer, which comprises the sequential steps of:

preparing an aqueous mixture of synthetic rubbery polymer latex and carbon black;

co-coagulating the polymer and carbon black to form a rubber-black masterbatch;

treating the rubber-black masterbatch with halogenating agent;

adding compatible plasticizer to the treated rubber-black masterbatch;

and allowing the plasticizer to be absorbed by the treated rubber-black masterbatch to yield a rubber-black-plasticizer masterbatch in particulate form.

In an embodiment of the process of the invention, a dispersion of carbon black in water is added to the aqueous polymerization latex in which the rubbery polymer has been prepared. Then the latex is co-coagulated, for example, with brine and acid, under conditions of high speed agitation. The rubber-black masterbatch is thereby obtained in particulate form. Then the masterbatch is treated with halogenating agent. The halogenated masterbatch is then mixed with plasticizer, preferably a hydrocarbon oil, under conditions of gentle to moderate agitation, until essentially all the plasticizer has been absorbed by the rubber-black masterbatch to yield a rubber-black-plasticizer masterbatch in particulate form. The degree of agitation used during the absorption of the plasticizer by the rubber-black masterbatch should be such that the components are mixed with each other but such that the conditions of shear due to the agitation are low enough so as not to deform the particles. The degree of agitation may vary during the absorption process. If desired, other compounding and curing ingredients can be added along with the oil at this stage, thereby simplifying the subsequent compounding and curing operation.

The methods of coagulating the rubber-black mixture include those well known in the industry for use with emulsion polymerized rubbers. These methods include using as coagulant aqueous solutions of sulphuric or hydrochloric acid, mixtures of inorganic salts such as sodium chloride with sulphuric or hydrochloric acid, or inorganic salts such as calcium chloride, aluminum sulphate or magnesium sulphate. Also included as a coagulation method is the process whereby the rubber-black mixture is coagulated with the aid of sulphuric acid or hydrochloric acid, optionally with inorganic salts present, in the presence of up to about 1 part by weight per 100 parts by weight of rubber of lignin.

An important feature of the present invention is that the oil is added to the rubber-black masterbatch only after the rubber-black masterbatch has been treated with halogenating agent. Whilst it is not intended that this invention should be limited to any particular theory of operation, it seems that the halogenating agent has a hardening effect on the surfaces of the rubber-black particles, and prevents coalescence or massing together of the particles on subsequent addition of oil. It is most unexpected that plasticizer could be mixed with rubber-black masterbatch particles without causing destruction of the particles by coalescing or massing.

The advantages of providing a particulate oil-extended rubber composition which may also be free flowing, as yielded by the process of the present invention, are self-evident. The material may be conveyed by pneumatic means, readily weighed in precise amounts, easily handled and easily mixed with other materials. However, the products of the present invention have been found to exhibit another and unexpected advantage. This resides in the energy requirements for mixing these products with other standard compounding and curing ingredients, which takes place in the factory mixing prior to molding and curing the rubber. It has unexpectedly been found that there is a significant reduction in the energy required to mix the compositions according to the present invention, with standard compounding and curing ingredients, in standard mixing equipment (banbury mixers, two roll mills, etc.) in order to prepare the necessary intimate admixtures of ingredients, as compared with similar oil-black-rubber compounds prepared by other processes. This is further demonstrated below in the specific examples. The energy requirements for factory mixing of oil-black masterbatch are normally high. Good, even dispersion of ingredients should be achieved to provide optimum vulcanizate properties, but the carbon black in an oil-carbon black masterbatch is normally not well dispersed. Thus the good dispersion normally has to be achieved in intensive factory mixing.

In the preferred embodiments of the process, the carbon black is made up as a dispersion in water, with one or more soaps or similar emulsifiers, and then the black dispersion is added to and mixed with the rubber latex. This is in accordance with known methods which may be used for the preparation of black masterbatch. It is important, however, in the blending of carbon black and latex as practised herein, to ensure that the black dispersion contains sufficient emulsifying soap. Otherwise, on mixing the black dispersion with the latex, there is a risk that soap from the rubber latex will migrate to the carbon black, creating an unstable polymer latex and causing premature coagulation of polymer. Additionally, the presence of the soap or emulsifier in the carbon black dispersion allows the black to exist in relatively small sized aggregates (whereas when black is dispersed in water only much larger sized agglomerates are present) which allows the practitioner to use concentrations of carbon black up to about 15 weight percent or more and which contributes to the subsequent good dispersion of the carbon black in the rubber phase. The final masterbatch may contain higher than normal levels of soap or emulsifier residues, which can act as a cure retarder. Suitable allowance for these residues may be made if necessary in the curing recipe, by small adjustments in the amounts and/or types of curative present.

The process of the present invention is generally applicable to all emulsion polymerized diolefinic hydrocarbon containing synthetic rubbers. It finds its best application, however, in the types of synthetic rubbers in which the plasticizer is a petroleum hydrocarbon extender oil, namely butadiene-styrene rubbers (SBR), emulsion polybutadiene rubber etc, wherein the diolefinic hydrocarbon is butadiene. It is also useful in preparing particulate oil resistant rubbers such as butadiene-acrylonitrile rubbers (NBR), which are plasticized with materials such as dioctyl phthalate.

In the process of the present invention, when the plasticizer is a hydrocarbon oil and the synthetic rubber is SBR, the types of oils used include those normally used to extend SBR, which are naphthenic and aromatic oils. Paraffinic oils are generally avoided. The oils are embraced by the petroleum extender oils as described in ASTM D2226-70 and which are described as the naphthenic, aromatic and highly aromatic oils known in the industry. The aromatic oils tend to be of higher viscosity. Thus when they are employed in the process of the invention they may exhibit slower rates of absorption into the polymer than are found for the naphthenic oils. This can be overcome by warming, so as to lower the viscosity. The oil may be added to dry halogenated rubber-black mixtures or to aqueous halogenated rubber-black mixtures.

The amounts of oil contemplated for use in the present invention are generally in accordance with those normally used in preparing oil extended rubber. Thus they comprise from about 5 to about 100 parts by weight oil per 100 parts by weight of rubbery polymer, preferably from about 10 to about 75 parts by weight per 100 parts by weight polymer. Whilst the major part of the oil is normally added to the masterbatch by the manufacturer thereof additional amounts may be added at the time of factory mixing with other compounding ingredients and curatives.

Similarly the amounts and types of reinforcing carbon black mixed with the rubber in the process of the present invention are generally in accordance with normal synthetic rubber making procedures. For use with SBR and emulsion polybutadiene rubbers, the amount of black is suitably from about 10 to about 120 parts by weight per 100 parts by weight of rubbery polymer, and preferably from about 30 to about 90 parts by weight per 100 parts by weight of rubbery polymer. The types of carbon black added are those well known in the art and are all the furnace blacks including the high structure, highly reinforcing furnace blacks.

For the butadiene-acrylonitrile rubber, the plasticizer is a polar compound exemplified by the esters of phthalic acid, e.g. the di-alkyl phthalates wherein the alkyl group contains from 4 to 12 carbon atoms such as di-octyl phthalate, di-butyl phthalate and butyl octyl phthalate; esters of aliphatic acids, e.g. butyl oleate, dibutyl sebacate, dioctyl adipate; polyesters and polythioethers; and esters of phosphoric acid, e.g. tri-cresyl phosphate. The amount of such plasticizer to be used in a butadiene-acrylonitrile rubber is preferably from 5 to about 50 parts by weight per 100 parts by weight of rubber. The types of carbon blacks are those commonly used in the compounding of butadiene-acrylonitrile rubbers and include the carbon blacks made by the thermal and the furnace processes. The furnace blacks used with butadiene-acrylonitrile rubbers would preferably be used in amounts from about 30 to about 100 parts by weight per 100 parts by weight of rubber, most preferably from about 50 to about 90 parts by weight. The thermal blacks used with butadiene-acrylonitrile rubbers may be used in higher amounts, namely in amounts ranging from about 50 to about 150 parts by weight per 100 parts by weight of rubber, and preferably in amounts from about 75 to about 125 parts by weight per 100 parts by weight of rubber.

As noted, the halogenation step in the process of the present invention takes place after the addition of carbon black to the polymer, but before the addition of plasticizer. In previous, standard manufacturing processes for making oil-black masterbatch, rubber latex, carbon black dispersion and oil are mixed together immediately prior to coagulation and the mixture is then coagulated. The result is the product previously referred to, which has poor black dispersion and massed readily. When a black masterbatch is prepared, the rubber-carbon black recovered from the latex is particulate in nature, but subsequent addition of oil causes coalescence or massing of the particles or at least would cause the particles to be subject to coalescence to such a product when under even slight pressure, e.g. on packaging. Treatment of the rubber-carbon black compound with a halogenating agent prior to adding oil, according to the present invention, prevents this coalescence to a large extent, and allows the compound to retain its particulate form.

As halogenating agent in the present invention may be used substantially any agent effective in brominating or chlorinating the synthetic polymer in a controllable manner under the chosen reaction conditions. One can use liquid or gaseous materials, or solutions of suitable halogenating agents in solvents which do not dissolve the rubber to any substantial extent. Preferred brominating and chlorinating agents are bromine, bromine water, chlorine, chlorine water, chlorine dioxide, sodium or potassium hypochlorite or hypobromite. Most preferred are bromine water and chlorine water, on account of their ease of handling, economy and the convenient rate of reaction with the unsaturated rubbery polymers.

The conditions under which the halogenation reaction is effected do not appear to be critical, provided that halogenation to an adequate degree is obtained. Such conditions can be chosen as a matter of convenience, and depend upon the halogenating agent being used, and the desired rate of reaction. Suitable reaction temperatures are from about room temperature (i.e. about 20° C) up to about 70° C. Suitable reaction pressures are from about atmospheric pressure up to about 50 psi. The reaction time may be from about 5 seconds up to about 1 hour. With the most preferred halogenating agents for use in the present invention, reaction conveniently takes place at room temperature, merely by treatment of the rubbery polymer composition with bromine water or chlorine water. The degree of halogenation can of course be varied by varying the halogen concentration or the time of reaction.

The preferred extent of halogenation according to the present invention is from about 0.75 to about 5 parts by weight of halogen present in 100 parts by weight of synthetic rubbery polymer, and most preferably from about 1.5 to 3 parts by weight. The presence of such amounts of halogen, does not appear to affect the curing characteristics of the rubbery polymer to any significant degree.

The invention is further described in the following specific examples.

EXAMPLE 1

An SBR latex was mixed with an aqueous dispersion of carbon black and with other compounding ingredients, coagulated, treated with bromine water and then mixed with oil.

The SBR used was a rubbery copolymer of about 75% by weight butadiene and 25% by weight styrene, Mooney viscosity (ML-4 at 202° F) about 140. This rubber was used in its aqueous latex form, as obtained by emulsion polymerization of the monomers. The 454g of latex used, stabilized with about 1.5 weight percent based on rubber of a mixed di-aryl-p-phenylene diamine antioxidant, contained approximately 100 grams of rubber solids.

50g of a high abrasion furnace carbon black were added to 170ml of water; 85 ml of an aqueous solution containing 5% of the sodium salt of a disproportionated rosin acid (an emulsifier) were added followed by 40ml of a dispersion of 10% zinc stearate in water, the whole being well mixed in a high speed mixer to yield a dispersion of carbon black in water. To this dispersion was added 5ml of a 10% aqueous solution of sodium hydroxide. This dispersion was then added at room temperature to the above latex, the resulting rubber-black dispersion then containing 50g of carbon black per 100g of rubber solids.

Into a coagulation vessel was placed 1055ml of a salt solution which contained 14g of NaCl per 670g of distilled water. Live steam was injected into the solution to bring the temperature to, and maintain it at, about 60° C. An acid solution was prepared by mixing 3.3g of concentrated sulphuric acid, 663g of distilled water and 41.5g of sodium chloride salt. The solution in the coagulation vessel was adjusted to a pH of about 4 by addition of the acid solution. The rubber-black dispersion and the acid solution were both added slowly to the solution in the coagulation vessel while maintaining the temperature at about 60° C and the pH at 4, the whole being subjected to violent agitation. These conditions were maintained for 30 minutes after completion of the addition of the rubber-black dispersion. The coagulated solids were recovered, washed with water and dried in circulating air. The product was in the form of generally spherical particles.

The above mixing and coagulation was repeated with a further batch of latex to obtain a further sample of compound. After drying, the two samples were blended to give about 300g of product I. The product I could be massed readily by pressing between thumb and foreginger, i.e. it did not maintain its particulate form. This property did not change on standing for an extended period of time.

A portion of the product was then halogenated by treatment with bromine water. A 50g sample (containing about 33.3g polymer) was gently stirred in 500 ml of water containing 1g of bromine. In about 2 minutes the water phase was colourless; the product was screened off and dried in air at 60° C. This product II so obtained contained about 2 parts bromine per 100 parts of polymer-black compound. The product II retained its generally spherical, particulate form.

Next, a 3g sample of the brominated rubber product II was oil extended, by stirring in 1g of hydrocarbon oil. The product II was placed in a small glass jar, the naphthenic oil was added and the whole was slowly mixed with a spatula. The particles absorbed the oil in a few minutes, and showed no tendency to stick together. The resulting granules were dry and free flowing.

A quantity of this oil extended product II was placed in a small glass jar and a bar of aluminum was rested on the product to constitute a load. The load was equivalent to 1.6psi After 24 hours under the load, the particles had matted together but could readily be crumbled into the original particles, even by shaking.

A similar oil extension experiment using 3g of product II and 1g of oil was undertaken using a highly aromatic oil. The bulk viscosity of this oil is higher than that of the naphthenic oil. Using the same procedure as above, it was found that the oil was absorbed within about 15 minutes to yield a particulate product which, when placed under load as described above, would mat but could be readily crumbled into the original particles. If the mixture of oil and product II was warmed to about 100° C, thereby reducing the viscosity of the oil, the oil was absorbed in a shorter period of time — about 5 to 10 minutes.

The oil extended product II is particulate in form and has no visual effect of surface oil — in fact the particles appear to be quite dry.

When a 3g sample of non-brominated rubber product I was similarly mixed with oil, massing occurred immediately, and the particulate form of the product was lost.

EXAMPLE 2

A black-rubber SBR masterbatch was prepared, coagulated, halogenated with bromine water and mixed with oil, largely as described in Example 1. Then the composition was compounded with standard rubber compounding ingredients, and the mixing energy required for compounding measured. This was compared with the energy required for compounding a standard masterbatch, not prepared according to the invention.

Compounding energy requirements were measured by compounding in a Brabender plasticorder with an extruder head. The extruder head had a barrel with a ¾ inch bore, a length/diameter ratio of 10/1 and a compression ratio of 2:1. The barrel was heated with circulating oil and maintained at about 80° C. The die used was circular, with ⅛ inch diameter. The die assembly was electrically heated and maintained at about 70° C. In the experiments, the extruder screw was driven at 50 rpm. The rubber compositions and compounding ingredients were first shaken together, and then extruded through the Brabender under the above conditions, repeatedly.

The shearing energy per gram expended in mixing is determined from a reading of the average torque, in kilogram-meters, obtainable directly from the Brabender charts, the total time of extrusion, the weight of compound extruded and the speed of the drive shaft of the extruder. Then the mixing energy per gram of compound is given by the formula:

$$2\pi Crt/w$$

where $C$ is the chart reading of average torque in kg.meters, $r$ is the speed of the drive shaft in revolutions per minute, $t$ is the extrusion time in minutes and $w$ is the weight in grams extruded.

As a test of the energy requirements necessary to obtain optimum vulcanizate properties, portions of the extrudates from each pass through the Brabender were molded, cured by heating at 145° C for 50 minutes and stress/strain properties were determined in the normal manner.

The compound according to the invention was prepared from the same SBR polymer latex, stabilized, as described in Example 1. A dispersion of carbon black in water was prepared, and 465g of carbon black dispersion, containing 75 g solid black, was added to 480g of the base SBR latex, containing 100 g of rubber solids. Coagulation was effected with salt and sulphuric acid at a pH of about 4. The coagulum consisted of discrete, essentially spherical particles about 1–2 mm in diameter. Two successive such coagulations were conducted and the products combined, to give a dry weight of 335g composition, containing 191g of polymer.

For halogenation, the product was stirred in a large vessel with 2500 ml of water. 2 phr of bromine was added in the form of 184 ml of bromine water solution containing 2.08 weight % bromine. After 5 minutes, the stirring was stopped, and the water was observed to be clear and colourless. Then agitation was started again, and 50phr (96g) of highly aromatic oil was added gradually. After thorough mixing, the agitation was stopped, and the compounds left to stand overnight. The next morning the water was clear and the floating masterbatch granules were discrete, with no evidence of unabsorbed oil. This demonstrates that oil can be added to the wet halogenated crumb, as well as to dry crumb as shown in Example 1, although the rate of absorption of oil on the wet crumb is somewhat slower.

For control purposes, a commercially available SBR oil black masterbatch was used, having the same content of bound butadiene and styrene in the SBR, carbon black and oil as the experimental compound, but no halogenation was undertaken. To bring this control material into a similar physical condition to the experimental composition, the control compound was ground into small pieces. The grinding was done with an Alpine Grinder, producing irregular pieces of about ¼ inch size.

Both the experimental compound and the control compound were mixed with standard rubber compounding ingredients and curatives. This was done by shaking the pelletized compounds with the various compounding ingredients. Then the mixing was concluded in the Brabender as described above. The compounding recipe adopted for each compound was as follows:

| | | |
|---|---|---|
| SBR polymer ⎫ | 100 | parts by weight |
| Oil  ⎬ masterbatch | 50 | parts by weight |
| Carbon black ⎭ | 75 | parts by weight |
| NBS Stearic acid | 1.5 | parts by weight |
| NBS Zinc Oxide | 3 | parts by weight |
| NBS N-tert.-butyl-2-benzothiazole sulphenamide | 1.25 | parts by weight |
| NBS Sulfur | 1.75 | parts by weight |

Both the experimental composition and the control composition were passed repeatedly through the Brabender extruder, and after each pass, a portion of the compound was molded, heated to cure it and the stress/strain properties determined. Maximum tensile strength of the vulcanizate is an indication of desirable complete and thorough mixing of the compound with the compounding ingredients.

It was found that the experimental compound yielded a vulcanizate of maximum tensile strength of 178 Kg/cm$^2$ after only two passes through the Brabender extruder, whch corresponded to a cumulative energy expenditure on mixing of 78 Kg-M/g. The tensile strength stayed at or just below the maximum for each of the third to tenth passes through the Brabender. The control sample had only achieved about 87% of its maximum tensile after two passes through the Brabender (cumulative energy expended 80 Kg-M/g), and required eight such passes (cumulative energy 264 Kg-M/g) to achieve its maximum tensile strength.

EXAMPLE 3

An SBR-black masterbatch as described in Example 1 was prepared and coagulated with brine and acid to provide about 700g of coagulum, in the form of granules about 1mm in size. A portion of this wet coagulum, after washing, was reacted with 2phr bromine as bromine water, as described in Example 1.

35g of brominated masterbatch was placed in a vessel, water was added to make up to 400 ml and the mixture was heated to 80° C. The mixture was agitated by means of a magnetic stirrer. 10 g of a highly aromatic oil (50 phr) was added over a period of 1 minute, and the agitation was continued for a further 5 minutes. No agglomeration of the masterbatch granules was observed. The mixture was then poured through a screen to separate the granules, and the product was dried at 60° C. The dry weight was 45g, showing that all of the oil had been taken up; the product retained its original granular form. This experiment demonstrates that faster rate of absorption of the oil can be obtained at elevated temperatures.

EXAMPLE 4

In this example a black-rubber masterbatch of a butadiene-acrylonitrile copolymer rubber was prepared and used in the process of the invention. The masterbatch was halogenated by treatment with bromine water, and then dioctyl phthalate plasticizer was added.

A dispersion of SRF carbon black in water was prepared, by mixing together 50g of the carbon black, 30 g of a 5% aqueous solution of Dowfax 2A1 (trademark) emulsifier, 3.3g of a 10% aqueous sodium hydroxide solution and 250g water. The dispersion was prepared by thorough agitation in a Waring Blendor. Then it was added to 310g of an aqueous latex of a butadiene (66wt.%) — acrylonitrile (34wt.%) rubbery copolymer stabilized with 4g of a 25% aqueous dispersion of 2,2'-methylene-bis-4-methyl-6-nonyl phenol. The latex had a solids content of 21.15%.

This mixture was coagulated by adding it gradually to a solution of 5g calcium chloride in 3 liters of water, at 71° C. The coagulated solids were recovered, washed with water and dried in circulating air. The product III was in the form of generally spherical particles.

A 17.5g portion of the product III was placed in a vessel with 100ml water, and 10ml of a 2 wt% solution of bromine in water was added. The mixture was stirred for 5 minutes, and then the product was screened off and dried at 60° C in air. The product IV so obtained contained about 2 parts bromine per 100 parts of polymer. The product IV retained its generally spherical, particulate form.

3.5g of this halogenated product IV was then mixed with 0.8g (40phr) of dioctyl phthalate plasticizer, and stirred with a spatula. The particles retained their original form after absorbing the plasticizer.

As a control, a 3.5g portion of the product III was then mixed with 0.8g (40phr) of dioctyl phthalate plasticizer, by stirring with a spatula as with the halogenated product. In this case, however, the particles coagulated into a single mass within a few minutes.

EXAMPLE 5

An SBR latex was mixed with an aqueous dispersion of high abrasion furnace carbon black to produce a rubber-black dispersion containing 50 g of carbon black per 100g of rubber solids, the latex, carbon black dispersion and mixing process being as described in Example 1. The dispersion was coagulated with sodium chloride solution and acid as described in Example 1, to yield a solid rubber-black masterbatch in the form of generally spherical particles.

Chlorine water was prepared by bubbling chlorine gas through distilled water, with stirring, for 30 minutes at room temperature, so as to obtain chlorine water containing 0.365% chlorine by weight.

15g of the particulate rubber-black masterbatch was placed in a vessel with 200ml water, and the mixture was stirred. 40ml of the chlorine water, containing 1.46 parts by weight chlorine per 100 parts rubber, was added to the mixture and the stirring was continued for 5 minutes. The granular product was filtered out with a screen, and dried in a stream of air at 140° F.

3g of the dried product was placed in a small vessel, and 1g of naphthenic hydrocarbon oil was added to the vessel, this amount constituting 50 parts of oil per 100 parts of rubber. The mixture was stirred with a spatula. The granules retained their particulate nature, and the oil was absorbed within 5 minutes.

In a parallel, controlled experiment, 3g of the same rubber-black granular masterbatch, which had not been treated with chlorine water, was placed in a similar vessel and stirred with 1g of the same naphthenic hydrocarbon oil. Within a few minutes, the granules matted together and the particulate nature of the product was lost.

EXAMPLE 6

In this experiment, an SBR rubber latex was mixed in the latex form with carbon black, coagulated in a salt free recipe using sodium lignate, and the resulting particulate masterbatch reacted with bromine water and then oil extended.

An aqueous dispersion of high abrasion furnace black was prepared by mixing, in a Waring Blendor for 5 minutes the following ingredients:

| | |
|---|---|
| High abrasion carbon black | 40g |
| 10% aqueous sodium hydroxide solution | 2g |
| Water | 158g |
| Disproportionated rosin acid soap (5% aqueous solution) | 67g |

A stable particulate carbon black dispersion was thus obtained. This dispersion was added to a mixture of 294g SBR latex (18.2% solids, about 75% polymerized butadiene and about 25% polymerized styrene), and 3.2g of sodium lignate solution (10.45% solids).

A serum was prepared by dissolving 10g of sodium sulphate in 1600ml distilled water. The temperature was adjusted to 140° F with steam, and the pH was adjusted to 3 by addition of 0.5% sulphuric acid solution. The latex-carbon black dispersion was added gradually to the serum with continuous agitation, thereby obtaining a granular coagulum having particles about 2-5 mm in diameter. The product was washed twice with water.

A 46.7g portion of the wet crumb was placed in a vessel with additional water, and 40ml of a 2wt.% solution of bromine in water was added. The mixture was stirred until the water phase was colourless. The product was screened and dried in a stream of air at 140° F. 17.5g of the dried particulate brominated product was mixed with 5g of naphthenic oil in a vessel. After standing overnight, the oil had been completely absorbed. The granules were free of surface tack and retained their particulate form.

What is claimed is:
1. A process for the preparation of a particulate rubber masterbatch of emulsion polymerized synthetic rubber selected from butadiene-styrene rubber, polybutadiene rubber and butadiene-acrylonitrile rubber, carbon black and compatible plasticizer, which comprises the sequential steps of:
   preparing an aqueous mixture of synthetic rubbery polymer latex and carbon black;
   co-coagulating the polymer and carbon black to form a rubber-black masterbatch;
   treating the rubber-black masterbatch with a halogenating agent selected from brominating and chlorinating agents in such an amount that the rubbery polymer contains from about 1 to about 5 parts by weight of halogen per 100 parts by weight of rubbery polymer;
   adding compatible plasticizer to be treated rubber black masterbatch; and
   allowing the plasticizer to be absorbed by the treated rubber-black masterbatch to yield a rubber-black-plasticizer masterbatch in particulate form.
2. The process of claim 1 wherein the halogenating agent is selected from bromine, bromine water, chlo- rine, chlorine water, chlorine dioxide, sodium hypochlorite, sodium hypobromite, potassium hypochlorite and potassium hypobromite.

3. The process of claim 2 in which the synthetic rubbery polymer is butadiene-styrene rubber or polybutadiene rubber, the compatible plasticizer is a hydrocarbon oil and is added in an amount of from about 5 to about 100 parts by weight per 100 parts by weight of rubbery polymer, and the carbon black is added in an amount of from about 10 to about 120 parts by weight per 100 parts by weight of rubbery polymer.

4. The process of claim 3 in which the synthetic rubbery polymer is butadiene-styrene rubber, the compatible plasticizer is a hydrocarbon oil added in an amount of from about 10 to about 75 parts by weight per 100 parts by weight of rubbery polymer, the carbon black is added in an amount of from about 30 to about 90 parts per 100 parts by weight of rubbery polymer, the halogenating agent is one of bromine water or chlorine water, and the rubbery polymer contains from about 1.5 to 3 parts by weight of halogen per 100 parts by weight of rubbery polymer.

5. The process of claim 2 wherein the synthetic rubbery polymer is butadiene-acrylonitrile rubber, the compatible plasticizer is a polar compound selected from esters of phthalic acid, esters of aliphatic acids, polyethers, polythioethers and esters of phosphoric acid and is added in an amount of from 5 to about 50 parts by weight per 100 parts by weight of rubbery polymer.

6. The process of claim 5 in which the carbon black is a furnace black and is added in an amount of from about 30 to about 100 parts by weight per 100 parts by weight of rubbery polymer.

7. The process of claim 5 wherein the carbon black is a thermal black and is added in an amount of from about 50 to about 150 parts by weight per 100 parts by weight of rubbery polymer.

* * * * *